(12) United States Patent
Achten et al.

(10) Patent No.: US 11,390,020 B2
(45) Date of Patent: Jul. 19, 2022

(54) POWDER COATING METHOD FOR MANUFACTURING 3D-PRINTED COMPONENTS HAVING IMPROVED MECHANICAL PROPERTIES

(71) Applicant: Covestro Intellectual Property GmbH & Co. KG, Leverkusen (DE)

(72) Inventors: Dirk Achten, Leverkusen (DE); Bettina Mettmann, Pulheim (DE); Thomas Buesgen, Leverkusen (DE); Roland Wagner, Leverkusen (DE); Maximilian Wolf, Cologne (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/297,030

(22) PCT Filed: Dec. 19, 2019

(86) PCT No.: PCT/EP2019/086161
§ 371 (c)(1),
(2) Date: May 26, 2021

(87) PCT Pub. No.: WO2020/127634
PCT Pub. Date: Jun. 25, 2020

(65) Prior Publication Data
US 2022/0024123 A1    Jan. 27, 2022

(30) Foreign Application Priority Data

Dec. 20, 2018 (EP) .................................. 18214397

(51) Int. Cl.
*B29C 64/153*     (2017.01)
*B29C 64/40*      (2017.01)
(Continued)

(52) U.S. Cl.
CPC .......... *B29C 64/153* (2017.08); *B29C 64/336* (2017.08); *B29C 64/371* (2017.08);
(Continued)

(58) Field of Classification Search
CPC ... B29C 64/153; B29C 64/336; B29C 64/371; B29C 64/40; B33Y 70/10
See application file for complete search history.

(56) References Cited

U.S. PATENT DOCUMENTS 7,879,282 B2    2/2011  Hopkinson et al.
8,535,036 B2    9/2013  Hopkinson et al.
(Continued)

FOREIGN PATENT DOCUMENTS

DE    102016207283 A1    11/2017
WO    2015/197515 A1     12/2015

OTHER PUBLICATIONS

International Search Report, PCT/EP2019/086161, dated Mar. 13, 2020, Authorized officer: Benoit Gasner.

*Primary Examiner* — Michael M. Robinson
(74) *Attorney, Agent, or Firm* — Jed C. Benson

(57) ABSTRACT

The invention relates to a method for producing an object from different powdered components by means of additive manufacturing, wherein a plurality of powdered components having different melting points are simultaneously placed in precise positions, and the powder coating (1) is subsequently thermally treated. The construction material is, for example, polyether ether ketone (PEEK), polyaryl ether ketone (PAEK), polyether ketone ketone (PEKK), polyether sulfone, polyimide, polyether imide, polyester, polyamides, polycarbonates, polyurethanes, polyvinyl chloride, polyoxymethylene, polyvinyl acetate, polyacrylates, polymethacrylates, polyethylene, polypropylene, polylactide, ABS (acrylonitrile butadiene styrene copolymers), PETG (glycol modified polyethylene terephthalate), polystyrene, or mix- (Continued)

tures thereof. The supporting material is an inorganic salt of the alkali metals, an inorganic salt of the alkaline earth metals, or a mixture thereof.

10 Claims, 1 Drawing Sheet

(51) Int. Cl.
*B29C 64/336* (2017.01)
*B29C 64/371* (2017.01)
*B33Y 10/00* (2015.01)
*B33Y 40/00* (2020.01)
*B33Y 70/10* (2020.01)

(52) U.S. Cl.
CPC ............... *B29C 64/40* (2017.08); *B33Y 10/00* (2014.12); *B33Y 40/00* (2014.12); *B33Y 70/10* (2020.01)

(56) References Cited

U.S. PATENT DOCUMENTS

| | | | |
|---|---|---|---|
| 10,751,951 B1* | 8/2020 | Nguyen | B29C 64/182 |
| 2005/0080191 A1 | 4/2005 | Kramer et al. | |
| 2015/0367446 A1* | 12/2015 | Buller | B23K 26/70 219/74 |
| 2016/0243764 A1 | 8/2016 | Hays et al. | |
| 2018/0273720 A1* | 9/2018 | Huang | B29C 64/165 |

* cited by examiner

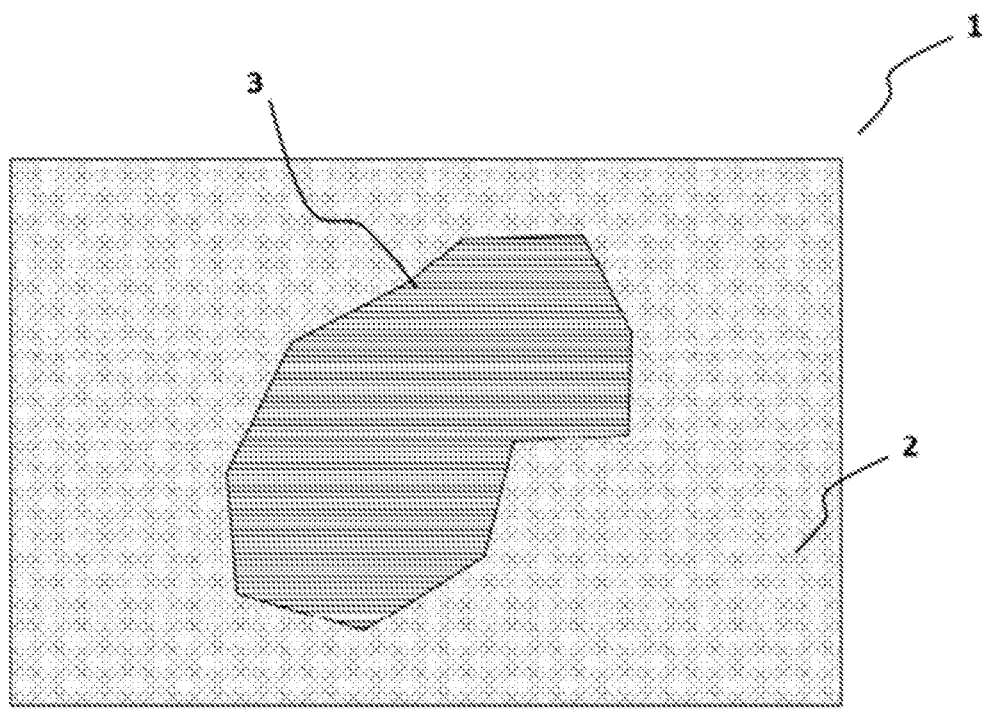

POWDER COATING METHOD FOR MANUFACTURING 3D-PRINTED COMPONENTS HAVING IMPROVED MECHANICAL PROPERTIES

CROSS-REFERENCE TO RELATED APPLICATION

This application is a national stage application under 35 U.S.C. § 371 of PCT/EP2019/086161, filed Dec. 19, 2019, which claims the benefit of European Application No. 18214397.4, filed Dec. 20, 2018, each of which is incorporated herein by reference.

FIELD

The present invention relates to a method of creating an article by means of additive manufacturing from various pulverulent components, wherein multiple pulverulent components having different melting points are simultaneously laid in specific locations and the powder layer is then subjected to thermal treatment. The present invention further relates to an article produced by such a method.

BACKGROUND

Additive manufacturing methods refer to methods by which articles are assembled layer by layer. They thus differ fundamentally from known material-removing methods, for example machining or drilling, which take on their ultimate geometry via removal of material from a larger blank. On the basis of the polymers predominantly used nowadays in additive manufacturing methods, however, it is usually "only" possible to obtain articles having resulting mechanical properties that differ fundamentally from the other plastics processing methods, for example injection molding. When processed by additive manufacturing methods, the thermoplastic materials used lose their known specific characteristics.

Nylon-12 (PA12) is the material currently most commonly used for powder-based additive manufacturing methods, for example laser sintering. PA12 is notable for high strength and toughness when it is processed by injection molding or by extrusion. A commercial PA12, for example, after injection molding has an elongation at break of more than 200%. PA12 articles that are produced by the laser sintering method, by contrast, show elongations at break around 15%. The component is brittle and therefore can no longer be regarded as a typical PA12 component. The same is true of polypropylene (PP), which is supplied in powder form for laser sintering. This material too becomes brittle as a result of the production process and hence loses the tough, elastic properties that are typical of PP. The reasons for this are to be found in the morphology of the polymers in conjunction with the production method. During the melting operation by means of laser or IR and especially in the course of cooling, a proportion of the polymer chains forms crystalline, tightly packed structures. The result is regions having semicrystalline morphology that are characterized by a high level of order. During melting and cooling, these crystallites grow irregularly at the boundaries of the incompletely molten particles and at the former grain boundaries of the powder particles and on additives present in the powder. This morphology promotes the formation of cracks under mechanical stress. Residual porosity, which is unavoidable in powder-based additive methods, makes a further contribution to crack propagation. As a result, the components thus produced exhibit comparatively brittle properties overall.

Even the pulverulent elastic polymers based on block copolymers that are used in laser sintering show a profile of properties of the finished components that is untypical of the polymers used. Thermoplastic elastomers (TPE) are used in laser sintering. Articles that are produced from the TPEs now available have high residual porosity after solidification, and the original strength of the TPE material does not correlate with the strength of the article manufactured therefrom. In practice, these porous components are therefore subsequently infiltrated with liquid hardening polymers in order to establish the profile of properties required. In spite of this additional measure, strength and elongation remain at a comparatively low level. The additional method complexity—as well as the still-inadequate mechanical properties—leads to poor economic viability of these materials and of the overall method.

Various solutions have been proposed in the prior art for the processing of these polymer classes within additive processing methods.

US 2005/0080191 A1 relates to a powder system for use in solid freeform fabrication methods, comprising at least one polymer having reactive and meltable properties, wherein the at least one polymer is selected in order to react with a liquid binder and to be meltable at a temperature above the melting point or glass transition temperature of the at least one polymer. The at least one polymer may comprise at least one reactive polymer and at least one meltable polymer, and the at least one meltable polymer may have a melting point or glass transition temperature in the range from about 50° C. to about 250° C.

DE 10 2016 207 283 A1 discloses a method of additively manufacturing a component, especially for a motor vehicle. The method has the following steps:—creating a shaped body from a multitude of mutually superposed shaped body layers of at least one first layer material and at least one second layer material, wherein an arrangement of the first layer material corresponds or corresponds essentially to a shape of the component to be created,—heating the shaped body by means of a heating device in such a way that the first layer material is melted, with fusion of adjacent first layer material elements to one another and without melting of the second layer material,—cooling the shaped body in such a way that the first layer material is solidified and—removing the excess second layer material from the shaped body to create the component.

US 2016/0243764 A1 describes a method of producing an article, comprising: laying a first layer of an object material on a support substrate electrode; applying a conductive material to the first layer; laying a first layer of a charge powder onto an intermediate substrate; transferring the first layer of the charge powder onto the intermediate substrate proximally to the first layer of the first object material, and applying an electrical transfer field in order to bring about transfer of the first layer of the charge powder from the intermediate substrate to the first layer of the substrate support electrode, such that a first powder layer is formed on the first layer of the substrate support electrode. Multiple powder layers may be laid on the first layer. The method may further include the fusing of the powder layer(s) to form a first fused layer on the substrate support electrode.

WO 2015/197515 discloses a thermoplastic pulverulent composition comprising 0.02% to 0.5% by weight, based on the total amount of composition, of plasticizer and pulverulent thermoplastic polyurethane, where at least 90% by weight of the composition has a particle diameter of less than 0.25 mm, where the thermoplastic polyurethane is obtainable from the reaction of components a) at least one organic diisocyanate, b) at least one compound having groups reactive toward isocyanate groups and having a number-average molecular weight (Mn) of 500 g/mol to 6000 g/mol and a number-average functionality of the totality of the components under b) of 1.8 to 2.5, c) at least one chain extender having a molecular weight (Mn) of 60-450 g/mol and a number-average functionality of the totality of the chain extenders under c) of 1.8 to 2.5, in the presence of d) optionally catalysts, e) optionally auxiliaries and/or additives, f) optionally one or more chain terminators. The thermoplastic polyurethane has a melting range (DSC, differential scanning calorimetry; second heating at heating rate 5 K/min) of 20 to 170° C. and a Shore A hardness to DIN ISO 7619-1 of 50 to 95. At a temperature T, the melt volume flow rate (MVR) to ISO 1133 is 5 to 15 cm$^3$/10 min. The change in the MVR in the event of an increase of this temperature T by 20° C. is less than 90 cm$^3$/10 min. The powder serves for production of articles in powder-based additive manufacturing methods.

There is still a need in the prior art for additive manufacturing methods capable of delivering components having satisfactory mechanical and homogeneous material properties overall.

SUMMARY

It is therefore an object of the present invention to at least partly overcome the disadvantages known from the prior art. More particularly, it is an object of the present invention to provide a way in which high stability of the components manufactured, especially also parallel to a layer direction, and/or homogeneous component properties overall are enabled. Furthermore, the disadvantages of long thermal stress as exist in the art of standard sintering methods are to be avoided.

What is therefore proposed is the method of the invention as per claim 1. Advantageous developments are specified in the dependent claims. They may be freely combined, unless the context clearly suggests otherwise.

BRIEF DESCRIPTION OF THE DRAWING

Various features and characteristics of the inventions described in this specification may be better understood by reference to the accompanying FIGURE, in which:

FIG. 1 shows a schematic view of the geometry of a powder layer on a substrate.

DETAILED DESCRIPTION

The present invention provides a method of additive manufacture of components, comprising the steps of:

a) laying at least two different pulverulent components having a difference in melting point of ≥50° C. once or more than once on a substrate or on an already laid layer, where the pulverulent component having the lowest melting point is laid in the form of the component and the pulverulent component having the highest melting point as the negative thereof in a layer;

b) subjecting the powder layer to heat treatment at a temperature above the melting point of the component having the lowest melting point and below the melting point of the component having the highest melting point, wherein the powder constituents of the component having the lower melting point are melted and at least partially fused;

c) cooling the heat-treated powder layer from step b) down to a temperature below the melting point of the lowest-melting component and d) removing the unfused pulverulent components to obtain the component.

In the process, either: the pulverulent component having the lowest melting point is selected from the group consisting of polyetheretherketone (PEEK), polyaryletherketone (PAEK), polyetherketoneketone (PEKK), polyethersulfones, polyimide, polyetherimide, polyester, polyamides, polycarbonates, polyurethanes, polyvinylchloride, polyoxymethylene, polyvinylacetate, polyacrylates, polymethacrylates, polyethylene, polypropylene, polylactide, ABS (acrylonitrile-butadiene-styrene copolymers), PETG (glycol-modified polyethylene terephthalate), polystyrene or mixtures of at least two of the aforementioned polymers, and the pulverulent component having the highest melting point is an inorganic salt of the alkali metals, an inorganic salt of the alkaline earth metals or a mixture of at least two of the aforementioned salts, or: the pulverulent component having the lowest melting point is polychloroprene (CR), polybutadiene (BR), polybutadienenitrile (NBR), hydrogenated polybutadienenitrile (HNBR), ethylene-vinyl acetate (EVA), fluoro rubber, styrene-butadiene block copolymers (SBS), polyvinylchloride (PVC), polyvinylacetate (PVA), polyfluoroethylene (PTFE) or polyarylsulfone, and the pulverulent component having the highest melting point is NaCl, MgSO$_4$, MgCl$_2$ or CaSO$_4$, except that CaSO$_4$ is not intended for polyfluoroethylene (PTFE).

The pulverulent component having the lowest melting point is also referred to hereinafter as "build material", and the pulverulent component having the highest melting point as "support material". Although the method of the invention is suitable for multiple different build materials and support materials, the terms "higher melting point" and "lower melting point" with respect to a method having a built material component and a support material component simultaneously mean "highest melting point" and "lowest melting point" respectively.

The above-specified method of the invention permits, in a particularly advantageous manner, the creation of an article by means of additive manufacturing, wherein the article created has high stability and homogeneous properties, especially homogeneous mechanical properties. The method further features a very high material yield based on the components to be sintered. The method differs from the prior art particularly in that at least two powders are applied or printed, of which at least one powder is inert in the subsequent thermal treatment or tempering step. This means that the inert, higher-melting component is capable of mechanically stabilizing and ideally densifying the melting component. In the subsequent thermal treatment step, the thermal and mechanical homogeneity of the component having the lower melting point can additionally be improved by the higher-melting component, which likewise leads to better mechanical properties. The latter can additionally be promoted by improved thermal conductivity of the component having the higher melting point. The particles of the component having the higher melting point can additionally have a favorable effect on the surface structure and roughness of the sintered component having the lower melting point. The overall powder layer composed of low- and high-melting component is subjected here to heat treatment or sintering, where the individual method steps of layering and heat treatment may be decoupled from one another, preferably also spatially. This simplifies process logistics. In addition, the method has the following advantages:

1. The costs of the primary powder layering unit are comparatively low since neither a heated built space nor a primary energy source is needed for the method. The build process is thus scalable as desired and can even be operated analogously to a continuous binder jetting method (Voxeljet AG, VXC800).
2. Step b) of heat treatment or tempering may be undertaken at any time and spatially separately from the site of production of method step a), the primary powder layer, and by means of conventional heating apparatuses.
3. The costs for unutilized or aged material, by virtue of the process, may be close to zero since at least the component having the higher melting point may have an inert configuration, such that this component can be "infinitely" reused.
4. The selection of the inert non-melting component, over a wide range of application, can be assigned to simple, non-toxic and inexpensive alkali metal or alkaline earth metal salts of Cl, O, $SO_4$, $CO_3$ that are inexpensive, chemically inert and additionally frequently water-soluble, and preferably have a higher density than the melting component, and hence enable low-cost and environmentally friendly cleaning of the desired additively manufactured components.
5. Furthermore, a broad selection of thermoplastic polymer material may be used as the component having a low melting point, which can be processed by means of an additive method. Thus, the material used may, for example, be any material that can be melted under suitable conditions and solidifies again. If multiple components having a similar, relatively low melting point are used, these can be arranged in different layers or else in the same layers.

The method of the invention also allows the processing of almost any thermoplastic powders since the problems with the build space method in the SLS and HS process do not occur. By the method of the invention, for the first time as far as the inventor is aware, it is also possible to process noncrystalline thermoplastics in a reliable method, i.e. with a build space temperature of preferably ≥5° C., more preferably ≥20° C. and most preferably ≥40° C., based on the softening temperature of the powder used, preferably based on organic polymeric materials, to give components of high mechanical quality, i.e. components having at least 50% of the tensile strength of injection-molded components.

The method of the invention can further achieve complex component geometries since the powder bed, analogously to the powder in the SLS and HS method, counteracts gravity in a protective manner. The overall result is logistical and cost advantages over the abovementioned method, and components having improved mechanical properties are additionally obtainable.

Without being bound by theory, the basis of the improved mechanical properties is considered to be that the component having the lower melting point, by means of embedding in a matrix composed of a component having a higher melting point, undergoes stabilization that leads to a more homogeneous sintering process and hence to more uniform surface and component properties.

The improved surface structure is manifested, for example, in reduced porosity of the component surface. The improved properties are manifested, for example, in an elevated hardness of the article, an elevated modulus and/or an elevated tear strength of the article with respect to the article printed according to the prior art.

Frequently, the material applied in powder form in this way, in a downstream sintering process, undergoes higher shrinkage of the powder volumes applied compared to an SLS or HSLS method. The resulting positive effect of a higher component density and strength is preferably taken into account in the process of designing the component for there to be no unwanted fluctuations in density and variations in geometry in the component. Analogously to the known SLS or HSS method, however, the invention also includes (partial) melting of the uppermost layer(s) in each case after the layer laying in order thus to achieve a higher density in the layer-forming build process.

It is envisaged in accordance with the invention that the pulverulent component having the highest melting point is an inorganic salt of the alkali metals, an inorganic salt of the alkaline earth metals or a mixture of at least two of the aforementioned salts. These salts are available in high volumes, in sufficient purity and at low cost. The salts are non-toxic and show high water solubility or solubility in aqueous acids. This can facilitate the removal of the salts. Moreover, the thermal conductivities of these salts are sufficiently high, such that it is possible to obtain high production rates with uniform temperature profiles. Particular preference is given to sodium chloride (NaCl), potassium chloride (KCl), magnesium chloride ($MgCl_2$), calcium chloride ($CaCl_2$)), potassium carbonate ($K_2CO_3$), lithium chloride (LiCl), magnesium oxide (MgO), magnesium sulfate ($MgSO_4$), calcium oxide (CaO), calcium carbonate ($CaCO_3$) and magnesium fluoride ($MgF_2$), or mixtures thereof. A further advantage of the salts is that they have a higher density than the polymers and can therefore be separated efficiently from the unsintered polymer particles via windsifting, and that they are easily and inexpensively preparable in extremely fine particle sizes and are noncombustible even under these conditions and do not cause any dust explosions.

It is also the case in accordance with the invention that the pulverulent component having the lowest melting point is selected from the group consisting of polyetheretherketone (PEEK), polyaryletherketone (PAEK), polyetherketoneketone (PEKK), polyethersulfones, polyimide, polyetherimide, polyester, polyamides, polycarbonates, polyurethanes, polyvinylchloride, polyoxymethylene, polyvinylacetate, polyacrylates, polymethacrylates, polyethylene, polypropylene, polylactide, ABS (acrylonitrile-butadiene-styrene copolymers), PETG (glycol-modified polyethylene terephthalate), polystyrene or mixtures of at least two of the aforementioned polymers.

It has been found that, surprisingly, these materials are particularly suitable for the method of the invention and, in particular, that these materials, in the course of the method of the invention, lead to particularly high mechanical strengths well above the strengths typically obtainable with these materials in prior art 3D printing methods.

It is possible to use powder mixtures. It is alternatively possible that the build material is mixed in situ from the various thermoplastic materials during the production of the article by means of the method of the invention. Preferably, in this embodiment, the mixing ratio of the different thermoplastic materials is variable in time or space, in relation to individual layers or in relation to individual volume elements (voxels) of a layer. In that case, it is possible to produce articles having three-dimensionally varying mechanical properties.

By contrast with customary fused polymer blends, the ratio of the physically and chemically mixed polymer phases can be controlled very precisely via the particle sizes and sintering temperatures, resulting in polymer blends having novel, highly controlled properties not obtainable via conventional melt blends. These properties that are preferably obtained via mixing of compatible interface-reactive (meaning the transurethanization reaction) components can be inferred from the improved strength, abrasion resistance and preferably the linear ratio of elongations at break. These effects can be adjusted via controlled conditioning or process-related thermal stress in the SLS construction space close to the melting temperature of the mixed phases involved. Preferably, the mixed phases undergo thermal stresses of ≥50° C., more preferably ≥40° C. and most preferably ≥30° C. above the melting temperature for at least 1 minute, preferably at least 3 minutes, more preferably at least 20 minutes and most preferably at least 30 minutes.

The meltable polymer is preferably a polyurethane obtainable at least partly from the reaction of aromatic and/or aliphatic polyisocyanates with suitable (poly)alcohols and/or (poly)amines or blends thereof. Preferably, at least a proportion of the (poly)alcohols used comprises those from the group consisting of: linear polyesterpolyols, polyetherpolyols, polycarbonatepolyols, polyacrylatepolyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least in part for preparation of the meltable polyurethanes are TDI, MDI, HDI, PDI, H12MDI, IPDI, TODI, XDI, NDI and decane diisocyanate. Particularly preferred polyisocyanates are HDI, PDI, H12MDI, MDI and TDI.

The component having the lowest melting point may comprise a multitude of pulverulent thermoplastic polyurethane materials that differ from one another by their Shore hardness (ascertained to DIN ISO 7619-1, edition of 2012-02) The build material may comprise, for example, 2, 3, 4, 5, 6, 7, 8, 9 or 10 pulverulent thermoplastic polyurethane materials that differ in their Shore hardness. Examples of suitable proportions by weight, based in each case on the total weight of the build material, and where the sum total of the proportions by weight adds up to ≤100% by weight.

If polyamides are used, preference is given to PA 6, PA 6.6, PA 6.9, PA 6.12, PA 11, PA 12, PA 4.6, PA 12.12, PA 6.12 and PA 10.10.

It is also advantageously possible to use polycarbonates. Specifically the polycarbonates, by virtue of the method of the invention, undergo exceptional stabilization that can lead to very dense and mechanically durable components. In addition, the surface of these components can have a particularly smooth and crack-free configuration. It is preferable that the meltable polymer is a polycarbonate based on bisphenol A and/or bisphenol TMC. Polycarbonate (PC) polymers as the material may be either homopolycarbonates or copolycarbonates; the polycarbonates may be linear or branched in a known manner. According to the invention, it is also possible to use mixtures of polycarbonates. The polycarbonates may be aromatic, aliphatic or mixed aromatic/aliphatic polycarbonate polymers. The polycarbonates are prepared in a known manner from diols, carbonic acid derivatives, and optionally chain terminators and branching agents.

Articles can be designed in such a way that regions expected to have high shrinkage are assigned material reservoirs in the design process that specifically fill regions with high shrinkage by powder material inflow, preferably under pressure, in step b). This can be achieved particularly advantageously in combination of a selective powder application process with a binder jetting method in which the boundaries of the non-melting powder are specifically strengthened with respect to the melting powder.

It is possible that the lowermost layer is built entirely on the basis of the at least one non-melting material. It is also possible that the uppermost layer is built entirely on the basis of the at least one non-melting material. It is also possible that the cumulative thickness of the layers beneath the lowermost layer including at least one melting material is ≥1 mm, preferably ≥2 mm and more preferably ≥5 mm, but preferably ≤5 cm. It is additionally possible that the cumulative thickness of the layers above the lowermost/uppermost layer including at least one melting material is ≥1 mm, preferably ≥2 mm and more preferably ≥5 mm, but preferably ≤50 cm.

Advantageously with respect to the standard powder methods, the process of the invention also enables the building of largely closed structures such as hollow spheres etc., since the stabilizing non-melting material used may be water-soluble or soluble by aqueous acids, and hence can be removed as a solution through even the smallest remaining openings. This is very advantageous compared to the need that otherwise exists to design larger openings.

The method of the invention is a method for additive manufacturing of components. The article to be produced here is not fundamentally limited in terms of its dimensions and geometry. More particularly, additive manufacture permits, in an effective manner, creation of a wide variety of different articles for a wide variety of different uses, and at the same time permits unlimited geometries. Accordingly, the article to be manufactured is also not subject to any restriction; instead, the method described here can in principle serve to shape any article that can be created by an additive method. However, the method described here is particularly preferred for those articles that require high stability or homogeneous mechanical properties.

Additive manufacturing methods refer to those methods by which articles are built up layer by layer. They therefore differ markedly from other methods of producing articles such as milling or drilling. In the latter methods, an article is processed such that it takes on its final geometry via removal of material.

There are known additive manufacturing methods that use thermoplastic powders to build up articles layer by layer. Examples of powder-based additive manufacturing methods are what are called selective laser sintering (SLS) or high-speed sintering (HSS). They differ from one another in the method of introducing into the plastic the energy for the selective melting. In the laser sintering method, the energy is introduced via a deflected laser beam. In what is called the high-speed sintering (HSS) method, as described, for example, in EP 1648686, the energy is introduced via infrared (IR) sources in combination with an IR absorber selectively printed into the powder bed. What is called selective heat sintering (SHS) utilizes the printing unit of a conventional thermal printer in order to selectively melt thermoplastic powders.

In method step a), at least two different pulverulent components having a difference in melting point of ≥50° C. are laid once or more than once on a substrate or on an already laid layer, where the pulverulent component having the lowest melting point is laid in the form of the component and the pulverulent component having the highest melting point as the negative thereof in a layer. The article is thus created by spatially selective arrangement of at least two pulverulent materials once or more than once, layer by layer and in accordance with a cross section of the article, on a substrate or already laid layers, wherein the two components have a difference in melting point of ≥50° C., preferably ≥100° C. and more preferably ≥200° C.

If more than two components are used, it is possible, for example, for two components to have lower melting points that are close to one another and for one component to have a much higher melting point. The average build space temperature in this method step is preferably ≤−30° C., more preferably ≤−50° C. and especially preferably ≤80° C. relative to the melting temperature of the lowest-melting component. In principle, the first material may be in powder form on the substrate or else may be applied in already molten form to the substrate.

The component having the lower melting point is laid here in the form of the desired component, and the component having the higher melting point around said laid component. This is preferably enabled by a line- or voxel-based method. It is possible to lay either first the melting component and then the non-melting component or first the non-melting component and then the melting component.

In one variant, both components are laid simultaneously. In a further variant, at least one of the powders is in the form of a powder dispersion, in which case the dispersant flows away or is largely evaporated during or before the sintering process. In this respect, a spatial separation between the two components arises within a laid layer. The spatial extent of the component having the higher melting point derives from the sites where the component having the lower melting point is not laid.

The component having the higher melting point thus forms the "negative" of the component having the lower melting point in the layer. If multiple components having different melting points are used, the component having the highest melting point in the respective layer always forms the area regions and later volume regions that do not form the component.

In a further variant, there may also be multiple high-melting components that are laid independently of one another. It is preferably the case that there is a difference in melting point of at least 50° C. between the components that melt in accordance with the invention and the non-melting components, which is not exceeded in the tempering step in the method of the invention.

In the method of the invention, an article is built up layer by layer. If the number of repetitions for application and irradiation is sufficiently small, it is also possible to make reference to a two-dimensional article which is to be built. Such a two-dimensional article can also be characterized as a coating. For construction thereof, ≥2 to ≤20 repetitions may be conducted for the layered application, for example.

Suitable pulverulent components may be thermoplastic materials that can be produced via various standard processes, for example grinding processes, cryogenic grinding, precipitation processes, spray drying processes and others.

As well as the meltable polymer, the particles may also comprise further additives such as fillers, plasticizers, pigments, dyes, fibers, stabilizers and the like, but also further polymers. The total content of additives in the particles may, for example, be ≥0.1% by weight to ≤60% by weight, preferably ≥1% by weight to ≤40% by weight.

In a preferred embodiment, fibrous fillers in particular may be distributed uniformly over a layer and hence lead to fiber-reinforced components in the region of the melting components after step b), while excess fibers in the region of the non-melting components can be separated therefrom by simple sieving processes and reused.

If the component having the highest melting point is used in the form of a powder bed, the powder particles of this material preferably have a particle size within a range from 1 to 1000 μm, preferably within a range from 10 to 2000 μm, or preferably within a range from 20 to 500 μm. The particle size is determined by laser diffraction by means of static laser diffraction analysis to ISO 13320:2009-10. Most preferably, the component contains inert particles that can be easily removed from and preferably washed off the component, because they are sufficiently soluble in acidic, basic and preferably neutral water at temperatures below the melting temperature of the components.

If the component having the lowest melting point is used in the form of a powder bed, the powder particles of this material preferably have a particle size within a range from 10 to 5000 μm, or preferably within a range from 20 to 2000 μm, or preferably within a range from 50 to 500 μm. The particle size is determined by laser diffraction by means of static laser diffraction analysis to ISO 13320:2009-10.

It is possible that the average resolution of the materials applied in the form of a two-dimensional, preferably polygonal, material voxel is a greatest two-dimensional diameter of ≤5 cm, preferably ≤1 cm, more preferably ≤1 mm and most preferably ≤0.5 mm, and a height of ≤2 cm, preferably ≤1 cm, more preferably ≤1 mm and most preferably ≤0.5 mm as a preferably convex material voxel. This form of layering especially increases the active surface area between the vertical layers.

In one variant, as well as the voxel-precise application of the powder particles via a roll and/or other surface press, the build volume and particularly the uppermost build layer is regularly preferably additionally compacted after each layer application.

In a further variant, the resolution of the material voxels for the component having the higher melting point is higher than the resolution of the material voxels for the component having the lower melting point. This is possible in a particularly advantageous manner since a higher density and a preferably noncombustible and nontoxic composition of the materials of the non-melting layer permits smaller particle voxels. This is without increasing the risk of powder explosion and/or powder concentration in the atmosphere in the course of layer building and/or on exposure of the products and on powder handling.

By virtue of the particular embodiment and the voxel-precise laying of materials, in a particular embodiment of the invention, fillers are also mixed in a controlled manner with meltable materials and are partly enclosed thereby in step b) and hence have a reinforcing effect.

In a further variant, the fillers are fillers having an aspect ratio of ≥10, preferably ≥50, i.e. fibrous fillers. The fillers may also already be a preformulated portion of the particulate melting powder materials.

In a further variant, it is thus also possible to supply liquids, for example plasticizers and leveling aids, to the powder layer in a controlled, voxel-precise manner, in order either to locally modify properties or to create separation planes.

It is likewise possible to use the method of the invention in combination with a binder jetting process in which a binder is additionally added for reinforcement of the structures of the component materials to be sintered and/or of the component materials that are not to be sintered. In a preferred embodiment, the properties of the binder material for the non-melting component are such that, after step b), the binder material can be recovered by mechanical crushing, for example in a roll or mill. This is the case, for example, as a result of the combination of NaCl and water.

Examples of methods of printing powder and/or powder dispersions that work layer by layer and potentially in a voxel-precise manner include: needle tube, laser jet or laser drum, screen printing, powder suspension printing and other methods that work with voxel-precise laying of pulverulent materials.

In method step b), the powder layer is subjected to heat treatment at a temperature above the melting point of the component having the lowest melting point and below the melting point of the component having the highest melting point, wherein the powder constituents of the component having the lower melting point are melted and at least partially fused.

Method step b) can be performed at the same site or else at a different site than method step a). Heat treatment of the powder layer here comprises increasing the temperature of parts of or the entire layer structure. This temperature rise can be induced by a customary heat source. It is possible to heat the components directly via contact with a heat source or indirectly by blowing in heated gases. The temperature rise at least partly plastifies and melts the component having the lower melting point, such that individual particles of the component having the lower melting point become bonded to one another to form an at least partly coherent component.

During this process step, the component having the lower melting point is stabilized mechanically in the layer by means of the component having the higher melting point. In addition, the thermal conductivity, as described above, can be distinctly improved by the presence of the component having the higher melting point. The powder layer is thus tempered, with the temperature of the powder layer generated, in the course of tempering, being at least $\geq 5°$ C., preferably at least $\geq 10°$ C. and most preferably at least $\geq 20°$ C. and most preferably $\geq 30°$ C. of the melting temperature of the lowest-melting component in the powder mixture. Preferably, the temperature in this step is at least below $-50°$ C. of the melting point of the highest-melting component of the powder mixture. Within this thermal configuration, it is possible to obtain particularly mechanically homogeneous components having improved mechanical properties.

Further preferably, for effective treatment of the article, it may be the case that the contacting of the article obtained with the powder bed in method step b) is conducted for a period within a range from $\geq 1$ minute to $\leq 168$ hours. It may further preferably be the case that the contacting of the article obtained with the powder bed in method step b) is performed for a period within a range from $\geq 10$ minutes to $\leq 48$ hours, further preferably within a range of $\geq 15$ minutes to $\leq 24$ hours, further preferably within a range from $\geq 20$ minutes to $\leq 8$ hours.

It is further preferable that there is at least 1 minute between conclusion of method step a) and the start of b).

It is further preferable that the distance between the location where step a) is executed and the location where step b) is executed is at least 1 m.

For example, in the case of the above-described periods of time, especially in the case of a treatment time of $\geq 1$ minute to $\leq 72$ hours, for the treatment of the article in method step b), it may further be the case that the temperature T of the powder bed is preferably varied in the course of method step b) and the temperature curve may optionally include temperatures of $-190°$ C. to $+2000°$ C. This may enable a particularly adaptive treatment, where it is possible to react to or take account of changing properties of the article during the treatment.

In a further preferred embodiment, it is still the case when the component having the lower melting point includes a binder that the temperature T is $\leq 95\%$, preferably $\leq 90\%$, more preferably $\leq 85\%$, of the breakdown temperature of the binder after crosslinking, where the breakdown temperature is defined as the temperature at which a loss of mass of $\geq 10\%$ is established in a thermogravimetric analysis at a heating rate of $20°$ C./min in a nitrogen stream. In this configuration, it is again possible to enable effective and simultaneously gentle treatment of the article.

In a particular embodiment, the choice of tempering process and of the temperature regime in the tempering process may have any desired temperature cycles. In this way, it is possible to specifically control crystallization and melting processes, and also glass transition processes in particular, in order to alter the properties of the additively sintered component in a desired manner. Desired properties here may be crystallite size, density, level of crystallization, hardness, strength, tensile strain, abrasion resistance, transparency and others.

In method step c), the heat-treated powder layer from step b) is cooled down to a temperature below the melting point of the lowest-melting component. After the sintering process has ended, the powder layer is cooled, which, in the simplest configuration, can be effected by switching off or removing the heat sources. But it is also possible to actively cool the powder layer. The partly sintered powder layer generated can be cooled to a temperature of at least $\leq -5°$ C., preferably at least $\leq -10°$ C. and most preferably at least $\leq -20°$ C. and most preferably $\leq$ at least $-30°$ C. below the melting temperature of the lowest-melting component. The powder mixture can be cooled within a period of $\geq 30$ sec. and $\leq 168$ h. The duration and temperature here should be chosen such that at least a portion of the molten/plastified component solidifies again, and the cooling conditions conform to the demands of the material.

In method step d), the unfused pulverulent components are removed to obtain the component. After obtaining the article, or after method step c), it can be released from the powder bed and optionally also from the component having the higher melting point or unmelted fractions of the component having the lower melting point. The article can be freed of powder residues by means of standard methods such as brushing, washing or compressed air. It may preferably be the case that the method includes at least one further method step or a combination of further method steps selected from:

partly removing the inert material from the article by mechanical means during or after the tempering, for example removing it by means of filtering, blowing, sucking, shaking, spinning or a combination of at least two of these; and washing off the inert material after the tempering after removal of the article from the powder with a solvent, where the solvent is not a solvent or coreactant for the component having the lower melting point and washing-off is effected at a temperature within a region of T $\leq 200°$ C., especially within a region of $\leq 150°$ C., preferably within a region of $\leq 100°$ C., further preferably within a region of $\leq 60°$ C., further preferably within a region of $\leq 40°$ C., further preferably within a region of $\leq 20°$ C., below the melting point of the component having the lower melting point. The period of time may preferably be ≤30 min, especially ≤25 min, preferably ≤20 min, further preferably ≤15 min, further preferably ≤10 min, further preferably ≤5 min. The period of time is preferably ≥1 second to ≤30 min, or preferably ≥10 seconds to ≤20 min.

The washing-off removes the component having the higher melting point from the overall surface of the component, preferably in one or more wash steps, to an extent of more than 90%, preferably to an extent of more than 95%, preferably to an extent of more than 99%. Powder coverage of a continuous particle layer on the component surface is defined here as the starting point for the measurement. Powder coverage can, for example, be counted or quantified in a simple manner by optical means using surface IR or microscope images.

Overall, this method step may include the removing of the sintered components from the partly sintered powder layer and mechanical and/or chemical removal of ≥60% by weight, preferably ≥70% by weight and most preferably ≥80% by weight of the unsintered components.

In a further preferred configuration of the method, 90% by weight of the particles of the pulverulent component having the lowest melting point have a particle diameter measured to ISO 13320:2009-10 of ≤0.25 mm. Within this particle size distribution, it is possible to obtain in particular homogeneous components having intricate surface structures from the component having the lower melting point. The particle size enables a uniform sintering process, and inclusion or diffusion of the component having the higher melting point is efficiently avoided. More preferably, the particle diameter of 90% by weight of the particles of the may be ≤0.2 mm, further preferably ≤0.1 mm.

In a further preferred embodiment of the method, the ratio of the average particle diameter of the pulverulent component having the lower melting point to the average particle diameter of the pulverulent component having the higher melting point, calculated from $D_{low}/D_{high}$, is ≥1 and ≤10. This ratio of the two particle sizes has been found to be particularly suitable in the process of the invention. The ratio prevents incorporation of the component having the higher melting point into the component, but leads to effective mechanical stabilization of the component surface since the powder particles of the component having the higher melting point is smaller and reaches closer to the component surface of the component having the lower melting point. The ratio of the particle sizes additionally leads to a homogeneous temperature distribution and rapid heating and cooling characteristics. Particle sizes can be determined to ISO 13320:2009-10.

In a preferred aspect of the method, the heat treatment in step b) is effected at a pressure difference of ≥25 kPa based on standard pressure. The method of the invention is sufficiently flexible that it can also be performed under pressure. The pressure can preferably be attained here via mechanical compression of the powder. This can effectively prevent warpage of the components in the cooling process. Preferred pressures that act on the sintered support and component cakes are ≥0.5 bar and most preferably ≥1 bar, and ≤50 bar and preferably ≤20 bar and most preferably ≤10 bar, since there is a risk at excessively high pressures that the support material and polymer will fuse to one another as a result of the pressure at the start of the cooling process.

In a further preferred embodiment, the gas used is an inert gas. This inert gas has neither an oxidizing or reducing effect at the treatment temperature chosen. Preferred inert gases here are $CO_2$, $N_2$, argon and neon.

In a further preferred embodiment, in method step b), the powder bed is at least intermittently put under elevated pressure. Preferably, the relative pressure, i.e. the gauge pressure, is within a range from ≥1 bar to ≤1000 bar, especially ≥1.5 bar to ≤200 bar, preferably ≥2 bar to ≤50 bar, more preferably ≥2.5 bar to ≤20 bar and most preferably ≥4 bar to ≤10 bar. This pressurization can be conducted in suitable autoclaves made of glass or metal by means of injection of a suitable gas or by mechanical reduction of the autoclave volume. In the case of application of elevated pressure to the powder bed, the temperature of the powder bed may be lowered, for example by ≥5° C. or ≥10° C., compared to process variants without pressurization.

It may further be preferable that, in method step b), the powder bed is at least intermittently put under elevated pressure or under reduced pressure. Preferably, the relative pressure, i.e. the reduced pressure, is within a range from ≥1 bar to ≤0.01 bar, especially ≥0.9 bar to ≤0.03 bar, preferably ≥0.8 bar to ≤0.05 bar, more preferably ≥0.7 bar to ≤0.08 bar. This evacuation can be conducted in suitable autoclaves made of glass or metal by means of removal of the suitable gas present in the autoclave or by mechanically increasing the autoclave volume. In the application of reduced pressure to the liquid or the powder bed, the temperature of the liquid or the powder bed may be lowered, for example by ≥5° C. or ≥10° C., compared to process variants without pressurization.

In a further preferred embodiment of the method, prior to the heat treatment in method step b), the powder layer is contacted with an inert gas. The use of inert gas may, for example, counteract unwanted degradation processes. An inert gas here may especially be understood to mean such a gas that does not react with the material of the article and with the material of the powder bed. More particularly, the gas should be configured such that it does not have any oxidizing properties with respect to the material(s) of the article and of the powder bed. Inert gas may more preferably be selected from the group consisting of helium (He), argon (Ar), nitrogen ($N_2$) and carbon dioxide ($CO_2$).

In a preferred embodiment of the method, the average temperature in method step b) is ≥20° C. higher than the average temperature in method step a). It has additionally been found to be advantageous that the temperatures in method steps a) and b) do not differ too significantly. This can accelerate the process of production as such since it is possible to dispense with prolonged heating. In addition, the small differences in temperature can result in melting processes in equilibrium, which can contribute to a particularly homogeneous surface and particularly homogeneous mechanical properties of the component. The temperature is preferably ≥30° C., 40° C., 50° C., 100° C. higher.

In a further preferred embodiment of the method, at least 3 pulverulent components are used, wherein at least 2 of the 3 pulverulent components comprise polyurethanes having a Shore hardness ascertained to DIN EN ISO 7619-1:2012 of ≥40A to ≤90D, and the differential in the Shore hardnesses between the 3 pulverulent components is ≥2A to ≤40A. For particular fine adjustment of the mechanical properties of the components, it has been found to be particularly suitable to use mixtures of different hardness as component having the lower melting point.

In this embodiment, the component having the lower melting point comprises a first pulverulent thermoplastic material and a second pulverulent thermoplastic material, where the first pulverulent thermoplastic material is a first polyurethane material and the second pulverulent thermoplastic material is a second polyurethane material, a polycarbonate material, a polyester material or a polyamide material. In this embodiment, it is preferable that the first pulverulent thermoplastic material is present in an amount of ≥40% by weight, based on the total weight of the build material.

In the case of use of a first and second polyurethane material, thermoplastic polyurethanes have the advantage that for materials in a comparatively small window of processing conditions, especially of processing temperature, a wide range of mechanical and/or chemical properties is available. For instance, it is possible to jointly process different thermoplastic polyurethanes having a Shore hardness (DIN ISO 7619-1) of ≥40A to ≤90D within a temperature range from ≥180° C. to ≤260° C., where the material obtained after the melting and cooling preferably has a Shore hardness between the greatest and smallest hardness of the polyurethanes used and/or has an elongation at break between the greatest and smallest elongation at break of the polyurethanes used.

This enables fine adjustment of the polyurethane properties, which can also vary spatially within the article to be produced itself. As a result of the chemical compatibility of the polyurethanes with one another, it is possible in the process of the invention to characterize the build material that has been melted and cooled down again at least at the particle interface as a polymer blend that differs from conventional polymer blends in that boundary regions arise between the particles that differ not just physically as a mixture but also chemically from the materials within the particles used. In polyurethanes as representatives of the addition polymers, at the processing temperatures used, urethane groups can open reversibly and transurethanizations can occur.

If, for example, two particles alongside one another are melted and one particle is constructed from a first polyurethane based on a first isocyanate and a first polyol and the other particle is constructed from a second polyurethane based on a second isocyanate and a second polyol, there may also be polyurethanes on the basis of the first isocyanate and the second polyol and on the basis of the second isocyanate and the first polyol in the contact zone as a result of transurethanizations.

In a further preferred embodiment, the build material comprises a first pulverulent thermoplastic polyurethane material and a second pulverulent thermoplastic polyurethane material, where the first pulverulent thermoplastic polyurethane material has a Shore hardness (DIN ISO 7619-1) of ≥40A to ≤90D, the second pulverulent thermoplastic polyurethane material has a Shore hardness (DIN ISO 7619-1) of ≥40A to ≤90D, and the difference in Shore hardnesses between the first and second pulverulent thermoplastic polyurethane material is ≥2A to ≤40A and/or ≥2D to ≤60D.

One example of such a build material suitable in accordance with the invention comprises a first pulverulent thermoplastic polyurethane material having a Shore hardness (DIN ISO 7619-1) of ≥70A to ≤80A and a second pulverulent thermoplastic polyurethane material having a Shore hardness (DIN ISO 7619-1) of ≥85A to ≤95A. The difference in Shore hardnesses between the first and second pulverulent thermoplastic polyurethane material is ≥5A to ≤25A.

A further example of such a build material suitable in accordance with the invention comprises a first pulverulent thermoplastic polyurethane material having a Shore hardness (DIN ISO 7619-1) of ≥60A to ≤70A and a second pulverulent thermoplastic polyurethane material having a Shore hardness (DIN ISO 7619-1) of ≥80A to ≤90A. The difference in Shore hardnesses between the first and second pulverulent thermoplastic polyurethane material is ≥10A to ≤20A.

In a further preferred embodiment, the build material comprises a first pulverulent thermoplastic polyurethane material, a second pulverulent thermoplastic polyurethane material and a third pulverulent thermoplastic polyurethane material, where the first pulverulent thermoplastic polyurethane material has a Shore hardness (DIN ISO 7619-1) of ≥40A to ≤90D, the second pulverulent thermoplastic polyurethane material has a Shore hardness (DIN ISO 7619-1) of ≥40A to ≤90D, the third pulverulent thermoplastic polyurethane material has a Shore hardness (DIN ISO 7619-1) of ≥40A to ≤90D, the difference in Shore hardnesses between the first and second pulverulent thermoplastic polyurethane material is ≥2A to ≤40A and/or ≥2D to ≤60D and the difference in Shore hardnesses between the second and third pulverulent thermoplastic polyurethane material is ≥2A to ≤40A and/or ≥2D to ≤60D.

One example of such a build material suitable in accordance with the invention comprises a first pulverulent thermoplastic polyurethane material having a Shore hardness (DIN ISO 7619-1) of ≥60A to ≤70A, a second pulverulent thermoplastic polyurethane material having a Shore hardness (DIN ISO 7619-1) of ≥75A to ≤85A, and a third pulverulent thermoplastic polyurethane material having a Shore hardness (DIN ISO 7619-1) of ≥90A to ≤90D. The difference in Shore hardnesses between the first and second pulverulent thermoplastic polyurethane material is ≥2A to ≤40A, and the difference in Shore hardnesses between the second and third pulverulent thermoplastic polyurethane material is ≥2A to ≤60D.

A further example of such a build material suitable in accordance with the invention comprises a first pulverulent thermoplastic polyurethane material having a Shore hardness (DIN ISO 7619-1) of ≥60A to ≤65A, a second pulverulent thermoplastic polyurethane material having a Shore hardness (DIN ISO 7619-1) of ≥70A to ≤75A, and a third pulverulent thermoplastic polyurethane material having a Shore hardness (DIN ISO 7619-1) of ≥80A to ≤90A. The difference in Shore hardnesses between the first and second pulverulent thermoplastic polyurethane material is ≥5A to ≤15A, and the difference in Shore hardnesses between the second and third pulverulent thermoplastic polyurethane material is ≥5A to ≤15A.

Within a preferred configuration of the method, at least 3 pulverulent components are used, wherein at least 2 of the 3 pulverulent components comprise polyurethanes having a Shore hardness ascertained to DIN EN ISO 7619-1:2012 of ≥40A to ≤90D, and the differential in the Shore hardnesses between the pulverulent components is ≥2A to ≤40A, and at least one pulverulent component has a melting point of ≥50° C. above the melting points of the other pulverulent components. This combination of mechanical and thermal properties of the different components can contribute to a particularly homogeneous sintering outcome and hence particularly isotropic mechanical properties of the component.

In a further preferred embodiment of the method, the pulverulent components in method step a) are laid via a location-selective laying method from the group consisting of powder screenprinting, powder suspension screenprinting, electrostatic roll or plate powder laying methods, powder jetting, powder dispensing, powder suspension printing or combinations of at least two methods therefrom. These methods are capable of working with different powder sources and can additionally provide the required accuracy to obtain high-precision components.

In a preferred configuration of the method, at least one of the low-melting powders is selectively melted in step a) via thermal activation. In this embodiment, the article can be produced via the steps of:

applying a layer of particles including the build material to a target surface;

introducing energy into a selected portion of the layer corresponding to a cross section of the article such that the particles in the selected portion are bonded;

repeating the steps of applying and introducing energy for a multitude of layers, such that the bonded portions of the adjacent layers become bonded in order to form the article.

This embodiment is a powder sintering or powder fusion method. If the number of repetitions is sufficiently low, the article to be constructed may also be referred to as a two-dimensional article. Such a two-dimensional article can also be characterized as a coating. For example, for construction thereof, ≥2 to ≤20 repetitions for applying and introduction of energy may be conducted. The energy source for bonding of the particles may be electromagnetic energy, for example UV to IR light. An electron beam is also conceivable. The bonding of the particles in the irradiated portion of the particle layer is typically effected through (partial) melting of a (semi)crystalline material and bonding of the material in the course of cooling. Alternatively, it is possible that other transformations of the particles such as a glass transition, i.e. the heating of the material to a temperature above the glass transition temperature, bring about bonding of the particles to one another.

In a further preferred embodiment of this method, at least one of the thermoplastic materials in the build material is a thermoplastic polyurethane elastomer obtainable from the reaction of a polyisocyanate component and a polyol component, said polyol component comprising a polyester polyol having a no-flow point (ASTM D5985) of ≥15° C. More particularly, the polyol component can include a polyester polyol having a no-flow point (ASTM D5985) of ≥25° C. to ≤90° C., preferably ≥35° C. to ≤80° C., further preferably ≥35° C. to ≤55° C. To determine the no-flow point, a test vessel containing the sample is set in slow rotation (0.1 rpm). A flexibly mounted measuring head is immersed in the sample and, on attainment of the no-flow point, is moved away from its position as a result of the abrupt increase in viscosity; the resulting tipping motion triggers a sensor.

Examples of polyester polyols which can have such a no-flow point are reaction products of phthalic acid, phthalic anhydride or symmetric alpha,omega-C4- to C10-dicarboxylic acids with one or more C2- to C10-diols. They preferably have a number-average molecular weight Mn of ≥400 g/mol to ≤6000 g/mol. Suitable diols are especially monoethylene glycol, 1,4-butanediol, 1,6-hexanediol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid (anhydride)+monoethylene glycol+trimethylolpropane; phthalic acid (anhydride)+monoethylene glycol. Preferred polyurethanes are obtained from a mixture containing IPDI and HDI or 4,4'-MDI as the polyisocyanate component and a polyol component containing an abovementioned preferred polyester polyol. Particular preference is given to the combination of a mixture comprising IPDI and HDI as polyisocyanate component with a polyester polyol formed from adipic acid+butane-1,4-diol+hexane-1,6-diol for formation of the polyurethanes. Preferred polyester polyols are further obtainable by ring-opening lactone polymerization, more preferably based on epsilon-caprolactone.

It is further preferred when these polyester polyols have an OH number (DIN 53240) of ≥25 to ≤170 mg KOH/g and/or a viscosity (75° C., DIN 51550) of ≥50 to ≤5000 mPas.

A further example cited is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of complex viscosity |η*| (determined by viscometry measurement in the melt with a plate/plate oscillation viscometer according to ISO 6721-10 at 100° C. and a shear rate of 1/s) of ≥4000 Pas to ≤160 000 Pas.

In a preferred embodiment of the method, at least one of the low-melting powders in step a) is colored or is selectively colored during the laying process in step a). The method of the invention additionally enables full or else only partial coloring of the component, where the individual components may be colorless. This can elevate the flexibility of the method and enable the production of a multitude of customer-specific components from one base material.

Within a preferred aspect of the method, the or at least one of the low-melting powders is a reactive powder which is reacted in method step b). What is meant by "reacting" in this connection is that the molecular structure of the polymers is altered with an extension or increase in the polymer chain. Combinations are obtained from the components that can have distinctly different behavior in terms of their mechanical properties than the individual polymers. It is thus possible in particular to influence the elasticity and mechanical strength of the components. The reacting can be controlled via different causes, for example temperature or other chemical or physical initiators. Thus, not only polyaddition reactions and polycondensation reactions but also polymerization reactions, for example free-radical polymerization reactions via a free-radical initiator, or else light-induced reactions are conceivable.

In a further preferred embodiment, the build material comprises a multitude of pulverulent thermoplastic polyurethane materials that differ from one another by their elongation at break (DIN 53504, 200 mm/min). The build material may comprise, for example, 2, 3, 4, 5, 6, 7, 8, 9 or 10 thermoplastic polyurethane materials that differ in their elongation at break.

In a further preferred embodiment, the build material comprises a first pulverulent thermoplastic polyurethane material and a second pulverulent thermoplastic polyurethane material, where the first pulverulent thermoplastic polyurethane material has an elongation at break (DIN 53504, 200 mm/min) of ≥200% to ≤800%, the second pulverulent thermoplastic polyurethane material has an elongation at break (DIN 53504, 200 mm/min) of ≥100% to ≤400%, and the difference in elongations at break between the first and second pulverulent thermoplastic polyurethane material is ≥50 percentage points to ≤700 percentage points.

One example of such a build material suitable in accordance with the invention comprises a first pulverulent thermoplastic polyurethane material having an elongation at break (DIN 53504:2017-03, 200 mm/min) of ≥300% to ≤500% and a second pulverulent thermoplastic polyurethane material having an elongation at break (DIN 53504, 200 mm/min) of ≥100% to ≤400%. The difference in elongations at break between the first and second pulverulent thermoplastic polyurethane material is ≥50 percentage points to ≤400 percentage points.

A further example of such a build material suitable in accordance with the invention comprises a first pulverulent thermoplastic polyurethane material having an elongation at break (DIN 53504, 200 mm/min) of ≥150% to ≤250% and a second pulverulent thermoplastic polyurethane material having an elongation at break (DIN 53504, 200 mm/min) of ≥200% to ≤450%. The difference in elongations at break between the first and second pulverulent thermoplastic polyurethane material is ≥50 percentage points to ≤300 percentage points.

In a further preferred embodiment, the build material comprises a first pulverulent thermoplastic polyurethane material, a second pulverulent thermoplastic polyurethane material and a third pulverulent thermoplastic polyurethane material, where the first pulverulent thermoplastic polyurethane material has an elongation at break (DIN 53504, 200 mm/min) of ≥200% to ≤600%, and the second pulverulent thermoplastic percentage points is up to ≤700 percentage points. One example of such a build material suitable in accordance with the invention comprises a first pulverulent thermoplastic polyurethane material having an elongation at break (DIN 53504, 200 mm/min) of ≥300% to ≤500% and a second pulverulent thermoplastic polyurethane material having an elongation at break (DIN 53504, 200 mm/min) of ≥100% to ≤400%. The difference in elongations at break between the first and second pulverulent thermoplastic polyurethane material is ≥50 percentage points to ≤400 percentage points.

A further example of a build material suitable in accordance with the invention comprises a first pulverulent thermoplastic polyurethane material having an elongation at break (DIN 53504, 200 mm/min) of ≥150% to ≤250% and a second pulverulent thermoplastic polyurethane material having an elongation at break (DIN 53504, 200 mm/min) of ≥200% to ≤450%. The difference in elongations at break between the first and second pulverulent thermoplastic polyurethane material is ≥50 percentage points to ≤300 percentage points.

In a further preferred embodiment, the build material comprises a first pulverulent thermoplastic polyurethane material, a second pulverulent thermoplastic polyurethane material and a third pulverulent thermoplastic polyurethane material, where the first pulverulent thermoplastic polyurethane material has an elongation at break (DIN 53504, 200 mm/min) of ≥200% to ≤600%, the second pulverulent thermoplastic polyurethane material has an elongation at break (DIN 53504, 200 mm/min) of ≥200% to ≤600%, the third pulverulent thermoplastic polyurethane material has an elongation at break (DIN 53504, 200 mm/min) of ≥200% to ≤600%, the difference in elongations at break between the first and second pulverulent thermoplastic polyurethane material is ≥50 percentage points to ≤100 percentage points and the difference in elongations at break between the second and third pulverulent thermoplastic polyurethane material is ≥50 percentage points to ≤100 percentage points.

One example of such a build material suitable in accordance with the invention comprises a first pulverulent thermoplastic polyurethane material having an elongation at break (DIN 53504, 200 mm/min) of ≥400% to ≤500%, a second pulverulent thermoplastic polyurethane material having an elongation at break (DIN 53504, 200 mm/min) of ≥300% to ≤400% and a third pulverulent thermoplastic polyurethane material having an elongation at break (DIN 53504, 200 mm/min) of ≥200% to ≤300%. The difference in elongations at break between the first and second pulverulent thermoplastic polyurethane material is ≥50 percentage points to ≤100 percentage points, and the difference in elongations at break between the second and third pulverulent thermoplastic polyurethane material is ≥50 percentage points to ≤100 percentage points.

A further example of such a build material suitable in accordance with the invention comprises a first thermoplastic polyurethane material having an elongation at break (DIN 53504, 200 mm/min) of ≥430% to ≤470%, a second thermoplastic polyurethane material having an elongation at break (DIN 53504, 200 mm/min) of ≥330% to ≤370% and a third thermoplastic polyurethane material having an elongation at break (DIN 53504, 200 mm/min) of ≥230% to ≤270%. The difference in elongations at break between the first and second thermoplastic polyurethane material is ≥70 percentage points to ≤85 percentage points, and the difference in elongations at break between the second and third thermoplastic polyurethane material is ≥70 percentage points to ≤85 percentage points.

In a further preferred embodiment, the build material, with regard to its fusible components, has a melting range (DSC, differential scanning calorimetry; 2nd heating at heating rate 20 K/min.) within the temperature range from ≥30° C. to ≤90° C. The melting range is preferably within a temperature range from ≥35° C. to ≤80° C. and more preferably from ≥45° C. to ≤70° C. In the DSC measurement for determination of the melting range, the material is subjected to the following temperature cycle: 1 minute at −60° C., then heating to 240° C. at 20 kelvin/minute, then cooling to −60° C. at 50 kelvin/minute, then 1 minute at −60° C., then heating to 150° C. at 20 kelvin/minute. It is possible that the temperature interval between the start of the melting operation and the end of the melting operation as determinable by the above DSC protocol is ≤80° C., preferably ≤60° C. and more preferably ≤50° C.

In a further preferred embodiment, the build material, with regard to its fusible components, has a melting range (DSC, differential scanning calorimetry; 2nd heating at heating rate 20 K/min.) within the temperature range from ≥100° C. to ≤240° C. The melting range is preferably within a temperature range from ≥110° C. to ≤230° C. and more preferably from ≥120° C. to ≤220° C. In the DSC measurement for determination of the melting range, the material is subjected to the following temperature cycle: 1 minute at −60° C., then heating to 260° C. at 20 kelvin/minute, then cooling to −60° C. at 50 kelvin/minute, then 1 minute at −60° C., then heating to 260° C. at 20 kelvin/minute. It is possible that the temperature interval between the start of the melting operation and the end of the melting operation as determinable by the above DSC protocol is ≤80° C., preferably ≤60° C. and more preferably ≤50° C.

In summary, the method of the invention is particularly suitable for the processing of thermally sensitive or high-melting semicrystalline thermoplastic polymers, and of amorphous thermoplastics having a sharp glass transition point. Particularly preferred method conditions are distinctly different from method conditions that are recommended by the manufacturers of the polymers for injection molding or for extrusion methods.

The experiments that follow showed that these standard processing conditions are typically unsuitable for the subsequent sintering process. Sintering temperatures preferred in accordance with the invention are at least 5° C. above the melting temperature in the case of semicrystalline thermoplastics and at least 35° C. above the melting temperature in the case of amorphous thermoplastics, and preferably at least 20° C., preferably at least 30° C. and most preferably at least 50° C., in the case of amorphous thermoplastics, below the processing temperature of the polymers normally recommended by the manufacturer in injection molding.

The sintering temperature is preferably chosen here such that the polymer in the melt has a complex viscosity (measured in oscillation in a plate-plate rheometer at a frequency of 1 Hz and an amplitude of 1%) at sintering temperature of ≥100 Pas and ≤50 000 Pas, more preferably ≥500 Pas and ≤30 000 Pas and most preferably ≥1000 Pas and ≤10 000 Pas. The sintering time here is preferably between 5 min and 4 h, more preferably between 10 min and 1 h and most preferably between 15 min and 1 h. Preference is given here to a combination of high sintering temperatures with short dwell times. High sintering temperatures in this context are temperatures of ≥50° C. above the melting point in the case of amorphous thermoplastics, and ≥20° C. above the melting point in the case of semicrystalline thermoplastics. Short dwell times in this context are sintering times of ≤30 min. In this way, stable sintered bodies are obtained in accordance with the invention, and the polymers are degraded only slightly or discolored only slightly and do not become so mobile that they can run into the support material.

According to the invention, complex viscosity in the melt at low shear rate is employed as a suitable orientation parameter, preferably measured in a plate-plate rheometer in oscillation at a frequency of 1 Hz and an amplitude of 1%, in a temperature range from the melting point of the polymer up to a temperature of not more than 150° C. above the melting point. According to the invention, operating points that show a complex viscosity of ≥100 Pas and ≤50 000 Pas are selected from this measurement, the viscosity being preferably ≥500 Pas and ≤30 000 Pas and most preferably ≥1000 Pas and ≤10 000 Pas, since particularly rapid sintering with particularly good component stability was observed in this viscosity window. In this way, process productivity and product properties are combined in an ideal manner.

The articles obtained in accordance with the invention can of course be processed further as known in the art. Examples of methods include infusion, coating, painting, flaming, fluorination and other known mechanical and chemical treatments for finishing and/or alteration and/or functionalization of the surface of plastic and metal articles.

In this regard, it is particularly preferable that, in the tensile test in accordance with DIN EN ISO 527:2012-06, the product has a tensile strength greater than the tensile strength of the untempered article, or, in other words, that the layers of the treated article have a tensile strength with respect to one another after method step b) that is greater than before method step b).

It is particularly preferable here that, in the tensile test in accordance with DIN EN ISO 527, the treated article has a tensile strength greater than the tensile strength of the untreated article by a magnitude of ≥10%, preferably by a magnitude of ≥20%, further preferably by a magnitude of ≥30%, further preferably by a magnitude of ≥50%, further preferably by a magnitude of ≥100%, where the values described above relate to the tensile strength of the untreated article or of the article before method step b). The advantageousness of the inventive method is particularly marked in the vertical build direction.

It is also possible to achieve the effect that the density of the treated article is greater than the density of the untreated article, or in other words that the density after method step b) is greater than before method step b). It may be particularly preferable here for the density of the treated article to be greater than the density of the untreated article by a magnitude of ≥2%, preferably by a magnitude of ≥5%, further preferably by a magnitude of ≥8%, further preferably by a magnitude of ≥10%, based on the density of the untreated article or based on the density of the article before method step b).

In a preferred configuration of the article of the invention, the surface of the article has an average roughness Ra determined to DIN EN ISO 4287:2010 of ≤1000 μm. Through the use of the method of the invention, it is possible to obtain particular surface structures of the component that differ entirely from those of surfaces produced conventionally via 3D printing. It is especially possible via the choice of suitable particle sizes, as described above, to obtain very smooth surfaces of the component. The surface roughness of the component may preferably be ≤500 μm, or preferably ≤200 μm, or preferably within a range from 10 to 500 μm, or preferably within a range from 50 to 200 μm.

Specified hereinafter, in the tables that follow, are examples of combinations of build material and support material that are particularly preferred according to the invention, but are not limiting in any way.

| Meltable polymer (build material) | Powder bed (support material) |
|---|---|
| Thermoplastic polyurethane (TPU) | NaCl, MgSO$_4$, MgCl$_2$, CaCO$_3$ |
| Polycarbonate (PC) | NaCl, MgSO$_4$, MgCl$_2$, CaCO$_3$ |
| Polymethylmethacrylate (PMMA) | NaCl, MgSO$_4$, MgCl$_2$, CaCO$_3$ |
| Polyamide (PA) | NaCl, MgSO$_4$, MgCl$_2$, CaCO$_3$ |
| Polypropylene (PP) | NaCl, MgSO$_4$, MgCl$_2$, CaCO$_3$ |
| Acrylonitrile-butadiene-styrene (ABS) | NaCl, MgSO$_4$, MgCl$_2$, CaCO$_3$ |
| Polyethylene (PE) | NaCl, MgSO$_4$, MgCl$_2$, CaCO$_3$ |
| Polyetheretherketone (PEEK) | NaCl, MgSO$_4$, MgCl$_2$ |
| Nylon-6 | NaCl, MgSO$_4$, MgCl$_2$, CaCO$_3$ |
| Nylon-6,6 | NaCl, MgSO$_4$, MgCl$_2$, CaCO$_3$ |
| Nylon-12 | NaCl, MgSO$_4$, MgCl$_2$, CaCO$_3$ |
| Nylon-4,6 | NaCl, MgSO$_4$, MgCl$_2$, CaCO$_3$ |
| Nylon-11 | NaCl, MgSO$_4$, MgCl$_2$, CaCO$_3$ |
| Copolyamide | NaCl, MgSO$_4$, MgCl$_2$, CaCO$_3$ |
| Copolyesteramide | NaCl, MgSO$_4$, MgCl$_2$, CaCO$_3$ |
| Copolyetheramides (PEBA) | NaCl, MgSO$_4$, MgCl$_2$, CaCO$_3$ |
| Polyaryletherketone (PEAK) | NaCl, MgSO$_4$, MgCl$_2$, CaCO$_3$ |
| Polyimide | NaCl, MgSO$_4$, MgCl$_2$, CaCO$_3$ |
| Polyaramid | NaCl, MgSO$_4$, MgCl$_2$, CaCO$_3$ |
| Polychloroprene (CR) | NaCl, MgSO$_4$, MgCl$_2$, CaCO$_3$ |
| Polybutadiene (BR) | NaCl, MgSO$_4$, MgCl$_2$, CaCO$_3$ |
| Polybutadienenitrile (NBR) | NaCl, MgSO$_4$, MgCl$_2$, CaCO$_3$ |
| Hydrogenated polybutadienenitrile (HNBR) | NaCl, MgSO$_4$, MgCl$_2$, CaCO$_3$ |
| Ethylene-vinyl acetate (EVA) | NaCl, MgSO$_4$, MgCl$_2$, CaCO$_3$ |
| Fluoro rubber | NaCl, MgSO$_4$, MgCl$_2$, CaCO$_3$ |
| Styrene-butadiene block copolymers (SBS) | NaCl, MgSO$_4$, MgCl$_2$, CaCO$_3$ |
| Polyvinylchloride (PVC) | NaCl, MgSO$_4$, MgCl$_2$, CaCO$_3$ |
| Polyvinylacetate (PVA) | NaCl, MgSO$_4$, MgCl$_2$, CaCO$_3$ |
| Polyfluoroethylene (PTFE) | NaCl, MgSO$_4$, MgCl$_2$ |
| Polyarylsulfones | NaCl, MgSO$_4$, MgCl$_2$, CaCO$_3$ |

Further advantages and advantageous configurations of the objects of the invention are illustrated by the drawing and elucidated in the description that follows. It should be noted that the drawing has solely descriptive character and is not intended to limit the invention. The FIGURE shows:

FIG. 1 a possible view of a single powder layer in top view.

FIG. 1 shows a schematic view of the geometry of a powder layer 1 on a substrate (not shown) after laying. Two different regions are present in the powder layer, namely region 2 and region 3, each with different components having different melting points. According to the desired configuration of the workpiece, one option is for region 2 to include a component having a higher melting point and region 3 a component having a lower melting point. Alternatively, it is possible for region 2 to include the component having the lower melting point and region 3 the component having the higher melting point. For example, if a layer of the desired workpiece is to have a geometry of region 3, this region 3 may be made up with a component having the lower melting point. The component having the higher melting point is then laid around and recesses this region 3. In this respect, a spatial separation between the two components arises within a laid layer. The spatial extent of the component having the higher melting point derives from the sites where the component having the lower melting point is not laid. The component having the higher melting point thus forms the "negative" of the component having the lower melting point in the layer. If multiple components having different melting points are used, the component having the highest melting point in the respective layer always forms the area regions and later volume regions that do not form the component. What is not shown here is that it is of course also possible for the regions 2 and 3 with the different materials to alternate repeatedly within a layer.

EXAMPLES

The present invention is elucidated in detail by the examples which follow, but without being limited thereto.

Test Methods:

The specimens obtained were tested by the tensile test to DIN EN ISO 527-2.

Grain sizes/particle diameters: Unless specified differently, grain sizes/particle sizes were ascertained by means of laser diffraction (HELOS particle size analysis) or reported as obtained from the manufacturer; if necessary, the powders obtained were sieved in order to assure a maximum grain size.

The melting point is determined here via DSC under protective $N_2$ gas at a heating rate of 20° C./min or taken from the product data sheets. In the case of a broad melting range, the melt peak temperature from DSC was defined as the melting point. In the case of a material having just one glass transition point, the turning point in the DSC is defined as the glass transition point.

Starting Materials:

NaCl: table salt of grain size ≤0.2 mm, after sieving through a filter sieve with 0.2 mm filter pores, melting point about 800° C.

Sand: Sakret quartz sand having a grain size of 0.1-0.5 mm, melting point about 1700° C.

Carnauba wax ("carnauba"): flake material in particle sizes 0.1-2 mm of Beegut carnauba wax (copernicia cerifera cera), melting point 80° C.

Polycarbonate ("PC"): Makrolon® 2408 was sourced from Covestro Deutschland AG. The polycarbonate powder used was obtained by cryogenic grinding. For this purpose, the polycarbonate was blended with 0.2% by weight, based on polycarbonate, of hydrophobized fumed silica as flow agent (Aerosil® R972 from Evonik), and the mixture was processed mechanically under cryogenic conditions (cryogenic comminution with liquid nitrogen) in a pinned-disk mill to give powder and then classified by means of a sieving machine. 90% by weight of the composition had a particle diameter of less than 0.14 mm (measured by means of laser diffraction (HELOS particle size analysis)). The glass transition temperature was 148° C.

Thermoplastic polyurethane 1 ("TPU-1"): Luvosint X92-A2 3D printing powder; ester-based thermoplastic polyurethane (TPU), white, was sourced from LEHMANN & VOSS Group and was classified through a 0.2 mm sieve prior to use; the particle size was ≤0.2 mm. The melting temperature was 160° C.

Thermoplastic polyurethane 2 ("TPU-2"): Polyurethane powder based on an ester-based polyurethane. Obtained by cryogenic grinding of the dried polymer film of a polyurethane adhesive dispersion. For this purpose, the dry polyurethane film was roughly mechanically comminuted and then blended with 0.2% by weight, based on the polyurethane, of hydrophobized fumed silica as flow agent (Aerosil® R972 from Evonik), and the mixture was processed mechanically under cryogenic conditions (cryogenic comminution with liquid nitrogen) in a pinned-disk mill to give powder and then classified by means of a sieving machine. 90% by weight of the composition had a particle diameter of less than 0.14 mm (measured by means of laser diffraction (HELOS particle size analysis)). The melting temperature was 48° C. The polyurethane is obtainable from the reaction of a polyisocyanate component and a polyol component, wherein the polyisocyanate component comprises an HDI and IPDI and wherein the polyol component comprises a polyesterpolyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight Mn (GPC, against polystyrene standards) of ≥4000 g/mol to ≤6000 g/mol.

Polyethylene powder ("PE"): RM 10440 UV, powder, metallocene polyethylene of moderate density obtained via polymerization by metallocenes (mMDPE) containing hexane as comonomer and antioxidant and UV-stabilizing additives. Powder with particle size ≤0.5 mm, used after filtering through a 0.5 mm filter sieve. The melting temperature was 140° C.

Nylon-12 ("PA12"): FS3300 PA from Farsoon, nylon-12 powder, melting point 183° C., for use in 3D powder printing, used as obtained.

Described hereinafter are various experiments in which an article produced by the method of the invention by separate laying of at least 2 different pulverulent materials having a difference in melting point of ≥50° C. was examined for its properties before and after tempering.

For production of the specimens of the invention, NaCl, and also the quartz sand for comparative experiments, were applied in multiple layers up to a height of at least 5 mm by means of the powder roller of a Farsoon FS251P 3D SLS printer at 23° C. onto a 10 cm*10 cm steel sheet of thickness 2 mm that had been laid on. Applied to this layer, again at 23° C., was at least 2 mm of a layer of a polymer powder by means of the same powder roller by exchange of the build material in the reservoir vessel of the Farsoon FS251P 3D SLS printer.

Applied to this layer in turn was at least 5 mm of NaCl in multiple layers until an asymmetric sandwich of NaCl-polymer-NaCl powder or sand-polymer-sand had been formed. The sandwich thus obtained was removed cautiously from the laser sintering printer on the steel sheet and heated in a separate oven to the desired temperature for a desired period of time in order to selectively sinter the polymer layer. The sintered polymer layer thus obtained was removed from the oven as a sandwich and left to cool to 23° C. within 1 h, weighted down during the cooling by a second 2 mm steel sheet having a weight of 1 kg in order to prevent warpage of the test specimens. Then the NaCl was freed entirely of NaCl, first mechanically by means of a soft brush and then by rinsing with tap water, and wiped dry with absorptive paper. The quartz sand was removed mechanically.

Multiple test specimens were punched out of the polymer sheet thus obtained (at slightly elevated temperature if necessary, in order to avoid premature brittle fracture of the test specimens), and the test specimens thus obtained were assessed visually and by touch, and, after conditioning (24 h at 23° C. and 50% relative humidity), tested in the DIN EN ISO 527-2 tensile test.

The results are listed as sample 1 to 21 in the two tables below. Comparative experiments are identified by *. All untempered powders showed no strength.

|  | Higher-melting material | Tempering at | Maximum stress MPa | Breaking stress MPa | Elongation at break % | Remarks |
|---|---|---|---|---|---|---|
| Carnauba | | | | | | |
| Specimen 1* | NaCl | 1 h, 90° C. | — | — | — | Material too low in viscosity, melt runs in the salt |
| PC | | | | | | |
| Specimen 2 | NaCl | 1 h, 200° C. | 25.1 | 25.1 | 2.9 | Yellow discoloration |
| Specimen 3* | NaCl | 1 h, 150° C. | — | — | — | Brittle; does not sinter |
| Specimen 4* | NaCl | 30 min, 175° C. | — | — | — | Brittle; does not sinter |
| Specimen 5* | NaCl | 1 h, 175° C. | — | — | — | Brittle; does not sinter |
| Specimen 6* | NaCl | 30 min, 185° C. | — | — | — | Brittle; does not sinter |
| Specimen 7 | NaCl | 1 h, 200° C. | 22.4 | 22.4 | 3.5 | sintered under $N_2$, almost uncolored |
| TPU-1 | | | | | | |
| Specimen 8 | NaCl | 1 h, 165° C. | 4.5 | 4.5 | 86.6 | |
| Specimen 9 | NaCl | 30 min, 185° C. | 12.4 | 12.4 | 150.2 | Slight yellow discoloration |
| Specimen 10 | NaCl | 30 min, 200° C. | 14.4 | 14.4 | 184.5 | Yellow discoloration |
| TPU-2 | | | | | | |
| Specimen 11* | NaCl | 2 h, 50° C. | — | — | — | Not sintered |
| Specimen 12 | NaCl | 1 h, 90° C. | 13.8 | 13.8 | 822 | |
| Specimen 13 | NaCl | 20 min, 185° C. | 11.3 | 11.3 | 685 | Slight yellow discoloration |
| Specimen 14 | NaCl | 30 min, 100° C. | 9.8 | 9.8 | 541 | Slight yellow discoloration |
| Specimen 15* | Sand | 1 h, 90° C. | 11.7 | 11.7 | 633 | Sand inseparable from matrix |
| Specimen 16 | NaCl | 1 h, 90° C. | 15.7 | 15.7 | >1000 | Sample weighted down with metal plate and 1 kg weight during sintering; no tearing |

Experiments marked * are comparative experiments

| | Higher-melting material | Tempering at | Maximum stress MPa | Breaking stress MPa | Elongation at break % | Remarks |
|---|---|---|---|---|---|---|
| PE | | | | | | |
| Specimen 17 | NaCl | 1 h, 160° C. | 12.1 | 3.8 | 15.1 | |
| Specimen 18* | NaCl | 1 h, 100° C. | — | — | — | Not sintered |
| Specimen 19 | NaCl | 30 min, 200° C. | 10.4 | 4.2 | 20.6 | |
| PA12 | | | | | | |
| Specimen 20 | NaCl | 1 h, 200° C. | 20.7 | 20.7 | 9.1 | |
| Specimen 21* | NaCl | 2 h, 175° C. | — | — | — | Yellow discoloration; not sintered |

Experiments marked * are comparative experiments

In the method of the invention, it was possible to sinter polymer powder laid in a 3D layer pattern with conservation of the geometry laid to give components having good mechanical properties. This also includes polymers that are considered to be difficult to sinter in sintering processes on account of their polymer properties, such as a high glass transition temperature (for example polycarbonate) or significant tendency to warpage and rapid crystallization (for example polyethylene), and particle sizes of ≥0.2 mm that typically lead only to high-porosity products in powder sintering methods.

Overall, the process of the invention is particularly suitable for the processing of thermally sensitive or high-melting semicrystalline thermoplastic polymers, and of amorphous thermoplastics having a sharp glass transition.

The experiments also show that polymers of low molecular weight (e.g. carnauba wax) do not lead to the desired dimensionally stable products since excessively low melt viscosities lead to flow of the polymer into the matrix of the support powder and to a loss of shape.

Moreover, the experiments show that temperatures used with preference should preferably be at least 5° C. above the melting temperature in the case of semicrystalline thermoplastics and at least 30° C. above the melting temperature in the case of amorphous thermoplastics and preferably at least 20° C. below the normal processing temperature for the polymers in injection molding recommended by the manufacturer.

Moreover, sintering experiments in unsuitable support powders that stick to the polymer powder and cannot easily be washed off show that it may no longer be possible to free the surfaces of the support powder, which leads to soiling of the surfaces and a loss of surface quality.

All experiments of the invention also show that the downstream sintering separated from the 3D build process not only has a distinct improvement in material yields since only the polymer material sinters, but that the products can be bound with preservation of the desired build shapes with respect to the powder to give high-quality, mechanically stable builds.

Moreover, the experiments show an improvement in mechanical properties after thermal storage of the invention compared to the untempered specimens, and the advantage of downstream inert sintering and the application of pressure during the sintering process and during the cooling process.

Compared to conventional laser sintering processes, there was a distinct increase in density of the samples subsequently tempered in accordance with the invention compared to the powder in the subsequent sintering process in the specimens observed, such that this expected shrinkage should preferably be taken into account even in the design of the desired printed product.

The invention claimed is:

1. A method of additive manufacture of a component, comprising:
   a) laying at least two different pulverulent components having a difference in melting point of ≥50° C. at least once on a substrate or on an already laid powder layer as one or more powder layers, wherein a pulverulent component having the lowest melting point is laid in a powder layer in the form of the component and a pulverulent component having the highest melting point is laid in the powder layer as a negative of the form of the component;
   b) subjecting individual powder layers and/or a plurality of powder layers to heat treatment at a temperature above the melting point of the pulverulent component having the lowest melting point and below the melting point of the pulverulent component having the highest melting point to form one or more heat-treated powder layers, wherein powder constituents of the pulverulent component having the lowest melting point are melted and at least partially fused;
   c) cooling the one or more heat-treated powder layers from step b) down to a temperature below the melting point of the pulverulent component having the lowest melting point; and
   d) removing unfused pulverulent components to obtain the component,
   wherein
   either: the pulverulent component having the lowest melting point comprises polyetheretherketone, polyaryletherketone, polyetherketoneketone, polyethersulfones, polyimide, polyetherimide, polyester, polyamides, polycarbonates, polyurethanes, polyvinylchloride, polyoxymethylene, polyvinylacetate, polyacrylates, polymethacrylates, polyethylene, polypropylene, polylactide, acrylonitrile-butadiene-styrene copolymers, glycol-modified polyethylene terephthalate, polystyrene, or mixtures of at least two of the aforementioned polymers, and in that
      the pulverulent component having the highest melting point comprises an inorganic salt of an alkali metal, an inorganic salt of an alkaline earth metal, or a mixture of at least two of the aforementioned salts, or: the pulverulent component having the lowest melting point comprises polychloroprene, polybutadiene, polybutadienenitrile, hydrogenated polybutadienenitrile, ethylene-vinyl acetate, fluoro rubber, styrene-butadiene block copolymers, polyvinylchloride, polyvinylacetate, polyfluoroethylene, or polyarylsulfone, and in that the pulverulent component having the highest melting point comprises NaCl, MgSO$_4$, MgCl$_2$, or CaSO$_4$, with the proviso that CaSO$_4$ is not combined with polyfluoroethylene.

2. The method as claimed in claim 1, wherein 90% by weight of the particles of the pulverulent component having the lowest melting point have a particle diameter measured according to ISO 13320:2009-10 of ≤0.25 mm.

3. The method as claimed in claim 1, wherein a ratio of the average particle diameter of the pulverulent component having the lowest melting point to the average particle diameter of the pulverulent component having the highest melting point, calculated from $D_{low}/D_{high}$, is ≥1 and ≤10.

4. The method as claimed in claim 1, wherein the heat treatment in step b) is effected at a pressure difference of ≥25 kPa based on standard pressure.

5. The method as claimed in claim 1, wherein the heat treatment in method step b) is preceded by contacting the one or more powder layers with an inert gas.

6. The method as claimed in claim 1, wherein an average temperature in method step b) is ≥20° C. higher than an average temperature in method step a).

7. The method as claimed in claim 1, wherein at least 3 pulverulent components are used, wherein at least 2 of the 3 pulverulent components comprise polyurethanes having a Shore hardness ascertained according to DIN EN ISO 7619-1:2012 of ≥40A to ≤90D, and a differential in the Shore hardnesses between the 3 pulverulent components is ≥2A to ≤40A.

8. The method as claimed in claim 1, wherein at least 3 pulverulent components are used, wherein at least 2 of the 3 pulverulent components comprise polyurethanes having a Shore hardness ascertained according to DIN ISO 7619-1:2012 of ≥40A to ≤90D, and a differential in the Shore hardnesses between the pulverulent components is ≥2A to ≤40A, and at least one pulverulent component has a melting point of ≥50° C. above the melting points of the other pulverulent components.

9. The method as claimed in claim 1, wherein the laying of the pulverulent components in method step a) via a location-selective laying method comprising powder screenprinting, powder suspension screenprinting, electrostatic roll or plate powder laying methods, powder jetting, powder dispensing, or combinations of at least two methods therefrom.

10. The method as claimed in claim 1, wherein a low-melting powder is a reactive powder which is reacted in method step b).

* * * * *